US010697746B2

(12) United States Patent
Lutz

(10) Patent No.: US 10,697,746 B2
(45) Date of Patent: Jun. 30, 2020

(54) DEVICE FOR ORGANIZING, CONVEYING AND PLACING AMMUNITION CASES

(71) Applicant: Carson Anthony Lutz, Wenatchee, WA (US)

(72) Inventor: Carson Anthony Lutz, Wenatchee, WA (US)

(*) Notice: Subject to any disclaimer, the term of this patent is extended or adjusted under 35 U.S.C. 154(b) by 24 days.

(21) Appl. No.: 16/154,715

(22) Filed: Oct. 8, 2018

(65) Prior Publication Data
US 2020/0109930 A1 Apr. 9, 2020

(51) Int. Cl.
*F42B 39/26* (2006.01)
*B65B 35/20* (2006.01)
*B65B 35/56* (2006.01)
*B65B 35/14* (2006.01)
*B65G 47/08* (2006.01)

(52) U.S. Cl.
CPC ............. *F42B 39/26* (2013.01); *B65B 35/20* (2013.01); *B65B 35/14* (2013.01); *B65B 35/56* (2013.01); *B65G 47/084* (2013.01)

(58) Field of Classification Search
CPC ......... B65B 35/14; B65B 35/56; B65B 35/20; B65G 4/084; F42B 39/26; F42B 39/00; F42B 39/20
USPC ................................. 206/3, 443, 486; 86/47
See application file for complete search history.

(56) References Cited

U.S. PATENT DOCUMENTS

| 142,575 A * | 9/1873 | Martin | B65D 5/5021 206/560 |
| 929,464 A * | 7/1909 | McGinnis | A23L 3/10 99/369 |
| 2,928,530 A * | 3/1960 | Sauey | B65D 1/24 206/3 |
| 2,979,210 A * | 4/1961 | Patterson | B01L 9/06 211/74 |
| 3,101,840 A * | 8/1963 | Canning, Jr. | F42B 39/26 206/3 |
| 3,204,774 A * | 9/1965 | Barbieri | A47F 7/024 211/4 |
| 3,538,636 A * | 11/1970 | Roth | F41A 9/84 42/87 |
| 3,813,987 A * | 6/1974 | Minneman | B65D 1/36 86/44 |
| 4,511,041 A * | 4/1985 | Waitzman | E05B 73/00 206/560 |
| 4,534,465 A * | 8/1985 | Rothermel | B01L 9/06 206/3 |

(Continued)

*Primary Examiner* — Chun Hoi Cheung

(57) ABSTRACT

A device for organizing, conveying and placing ammunition cases consists of a module with an array of funnels on the top face. When cases are poured onto the top face the funnels direct the cases into bores below, generally with the heavy end (rim and extractor groove end) down. Edges of apertures in a plate which slides in a slot in the bottom of the module engage the extractor groove in each case and secure the cases between the plate and module with spring pressure. After securing the cases they may be conveyed to another location at which point the spring may be compressed to release the cases leaving them arranged neatly. A tray is used to contain and interface with a plurality of modules. By adjusting wedges in the tray, the plates in the module assemblies engaged by the wedges are caused to operate as described previously.

7 Claims, 7 Drawing Sheets

(56) References Cited

U.S. PATENT DOCUMENTS

| | | | | | |
|---|---|---|---|---|---|
| 4,757,894 | A | * | 7/1988 | Schreckenstein | F42B 39/02 |
| | | | | | 206/1.5 |
| 4,811,836 | A | * | 3/1989 | Minneman | F42B 39/26 |
| | | | | | 206/3 |
| 5,052,549 | A | * | 10/1991 | Scharch | F42B 39/00 |
| | | | | | 206/3 |
| 5,878,882 | A | * | 3/1999 | Kohagura | B25H 3/003 |
| | | | | | 206/379 |
| 6,082,529 | A | * | 7/2000 | DeLuca | B65D 71/70 |
| | | | | | 206/3 |
| 6,132,684 | A | * | 10/2000 | Marino | B01L 9/06 |
| | | | | | 211/74 |
| 8,320,062 | B1 | * | 11/2012 | Persson | G02B 7/021 |
| | | | | | 359/811 |
| 9,144,801 | B2 | * | 9/2015 | Johnson | B01L 9/06 |
| 2012/0321431 | A1 | * | 12/2012 | Riedesel | F42B 39/26 |
| | | | | | 414/802 |
| 2015/0096907 | A1 | * | 4/2015 | Connolly | F42B 39/26 |
| | | | | | 206/3 |

* cited by examiner

DEVICE FOR ORGANIZING, CONVEYING AND PLACING AMMUNITION CASES

BACKGROUND

There are several time-consuming steps in reloading cases reclaimed from spent ammunition cartridges. The first step is to gather reloadable cases. If the reloader chooses to clean said cases, they are usually processed in wet or dry tumbling media, then separated from the media. There are several existing inventions for media separation; those inventions do not always remove all the media completely. A common method for separating wet media (common wet media is stainless steel pins tumbled with the cases) is to place the cases and media in a colander, and manually mix the cases while rinsing until most of the media falls through the colander holes, leaving the cases in the colander. Still some media often remains in the cases and the reloader must check them individually to ensure there are no pins remaining in the cases.

After the wet cases have been removed from the colander, they must be dried. If the reloader has time, the cases are commonly set on towels to dry overnight or longer. If time is short, the reloader will place the cases on a cookie sheet in an oven to accelerate the drying process; the cases dry faster if they have space between them for air to flow. Another method is to spread out the cases on a food dehydrator tray and use the dehydrator's warm airflow to dry the cases.

The next step is to lube the outside of the cases in preparation for insertion into a resizing die within a reloading machine. If spray lube is used, a common technique is to manually and individually stand the cases upright and spray the sides of the cases from opposing directions to ensure good coverage. There are several existing inventions which provide pockets for cases to be spaced in an orderly fashion standing upright, but these inventions do not provide a means by which the cases may be automatically organized—the cases must still be manually placed in the pockets. At a time of the reloader's choosing within the entire process, the cases are also inspected for abnormalities. This is often done during the cleaning, drying, or lubing process, concurrently with those manual processes.

Some reloaders prefer to charge cases with gunpowder while they are standing upright, as opposed to being charged as part of a reloading machine process. Reloaders will often purchase an existing invention called a loading block, or build their own loading block, for this purpose of filling the cases as part of an organized, systematic process. A loading block is an array of equally spaced bores which requires the reloader to manually stand the cases upright individually in each bore. For the forgoing reasons, there is a need to have an invention which saves time and effort throughout the reloading process by automatically organizing, orienting and placing cases.

SUMMARY

This invention was designed to streamline the reloader's workflow by providing a device which can replace the manual processes of organizing, orienting and placing cases commonly practiced in multiple steps within the reloading process. One object of this invention is to be used as a media separator. If using wet media to clean cases (a common wet media is stainless steel pins tumbled with cases), the pre-separated mixture including cases, pins and liquid may be poured over the module assemblies, whereby, through back-and-forth horizontal agitation, the pins will fall through the module assembly and any pins remaining in the cases can be shaken out when the module assembly is turned upside down with cases captured. Also the module assembly with cases captured may be rinsed together as a unit. The tray is designed to retain the pins above the screen layer at the bottom of the tray, while letting liquid through. The pins may be collected for re-use or may be left within the tray to dry, then collected and stored for re-use.

Another object of the invention is to aid in the drying process after cases have been cleaned if using a wet media or washing process. Placing wet cases in a uniform array allows for timely and more uniform drying. Cases in placed arrays, module assemblies with captured cases and/or trays with inserted module assemblies with captured cases may be loaded into a drying apparatus such as a food dehydrator or fan box. This allows the reloading process to accelerate when there is not enough time to wait for cases to air-dry.

Another object of the invention is to aid in visual inspection. Cases may be visually inspected more easily as a group while they are captured in the module assembly or released in an array on an inspection surface or turntable. Each end of the case—neck and base—may be inspected while captured in the module assembly. Cases may be released from the module assembly base-up or neck-up, depending on how the assembly is oriented when they are released.

Another object of the invention is to aid in lubrication. Cases may be released from the assembly in a neat array on the reloading bench or turntable, assisting the reloader with even coverage when spraying lube on the outside of cases.

Another object of the invention is to save time through better organization. Neat arrays with equal space between cases allows the reloader to process the cases more smoothly and in a timely manner, by being able to grasp the cases easily. It is common for reloaders to draw from a pile or bucket, which requires having to check cases for orientation before placing in a reloading machine. This invention places cases all in the same orientation. Also having blocks of cases in specific groups (such as a suggested array of 25 comprised of 5 columns and 5 rows as released from the assembly) gives the reloader a structured way of quickly calculating total number of casings, as 25 is a common module and is a common denominator in manufactured and reloaded box counts, as well as reloading components such as bullets and primers.

Additional advantages and features will become apparent when considering the included specification and drawings.

DESCRIPTION OF THE DRAWINGS

Reference the accompanying drawings for illustrations of the following.

DETAILED DESCRIPTION

Figure 1:
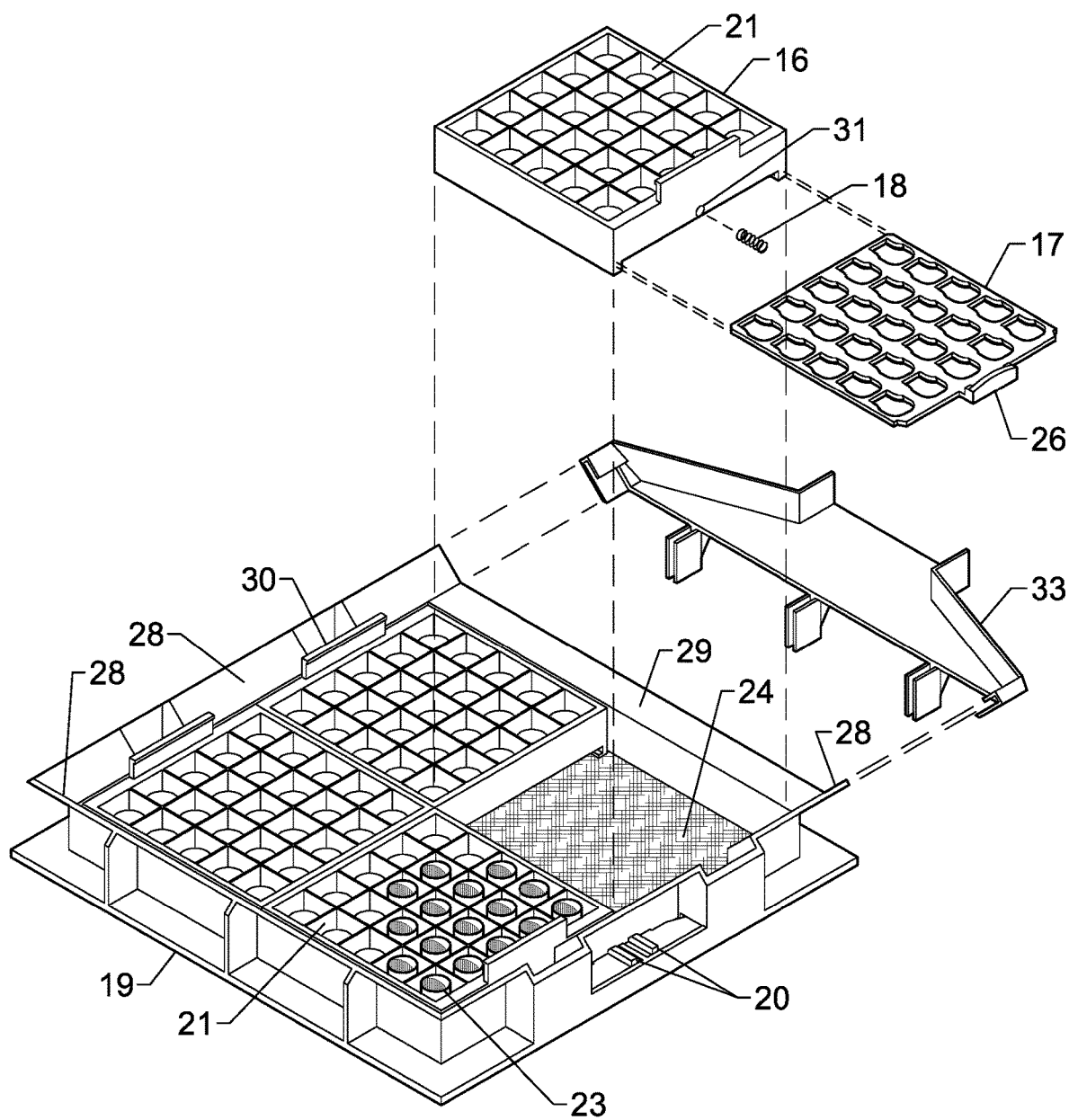
FIG. 1 is an exploded isometric view of the tray and module assemblies.

Referring to the drawings there is shown generally, as indicated by reference numeral 16, a module with a plurality of funnels 21 in the top face, with the top of the funnels 21 having a square shape and the bottom of the funnels 21 having a round shape with size proportionate to the caliber of ammunition cases 23 being organized. The form of the funnel 21 transitions smoothly from the square shape at top to the round shape at bottom.

Below each funnel 21 is a bore 22 which extends through the module 16 vertically. The vertical height of the bottom of the module 16 to the top of the funnel 21 is approximately equal to the height of the type of ammunition case 23 being organized. Because the top of the ammunition case 23 is substantially aligned with the top of the module 16, this allows excess ammunition cases to be swept off the top face of the module when the ammunition cases 23 have occupied the bores 22. Height of the module 16 will vary depending on what size of ammunition case 23 is being organized. Also height may be adjusted in an alternative embodiment to where the bore 22 height is minimized so that more of the ammunition case 23 is exposed for better visual inspection of ammunition cases 23, but not less than what is needed to provide proper capture function of the module assembly 15. Center-to-center distance of bores 22 also will depend on size of ammunition cases 23 being organized. In the instance of the illustrated embodiment, the ammunition case 23 type is .45 caliber ACP and the center-to-center distance between bores 22 is 0.75 inches. Bore 22 diameter corresponding to the .45 ACP case is 0.53 inches. Other popular cartridge ammunition cases 23 for which corresponding modules 16 and plates 17 may be made include, but are not limited to, 9 mm, 10 mm, .40 S&W, .32 ACP, .38 Super, .357 Sig, and .380 ACP. Total length and width of module 16 is dependent on ammunition case 23 type, array number desired, and edge distance required for proper engagement of a plate 17 in the module slot 27 and function of a button 26 on the end of the plate 17. Total dimension for the top face of the module 16 in the illustrated embodiment for .45 caliber is 3.94 inches wide and 4.09 inches long, with length dimension being that which is aligned with the movement of the plate 17.

Figure 3:
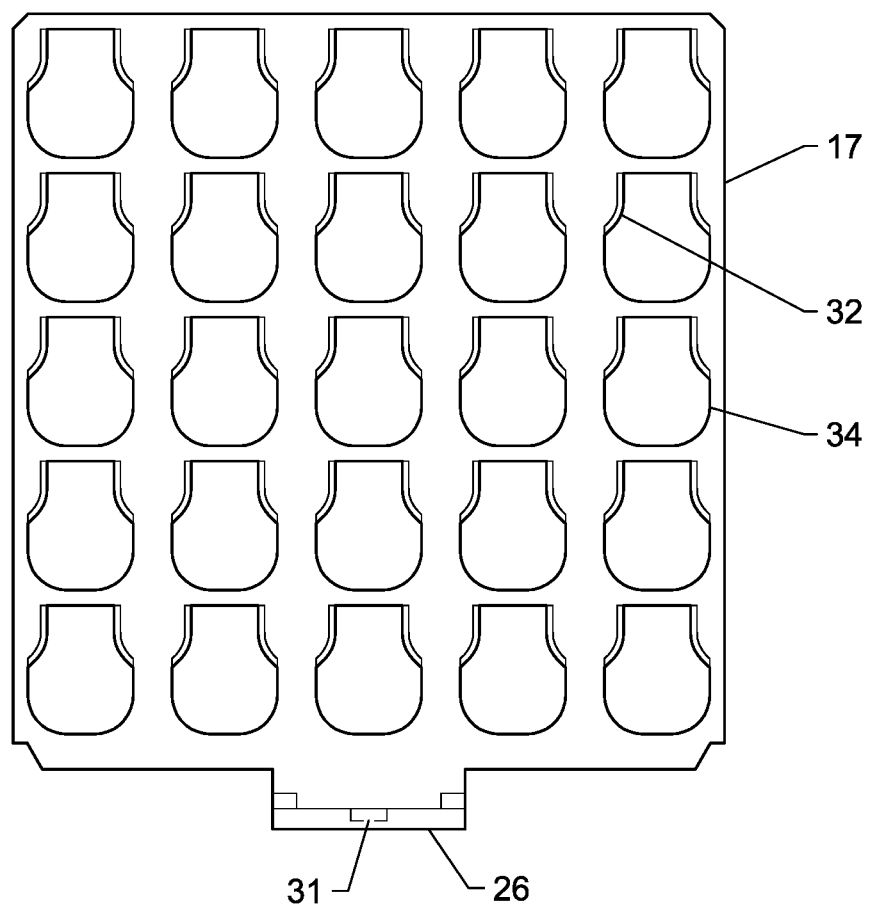
FIG. 3 is a top plan view of the plate showing aperture arrangement and configuration.
Figure 4:
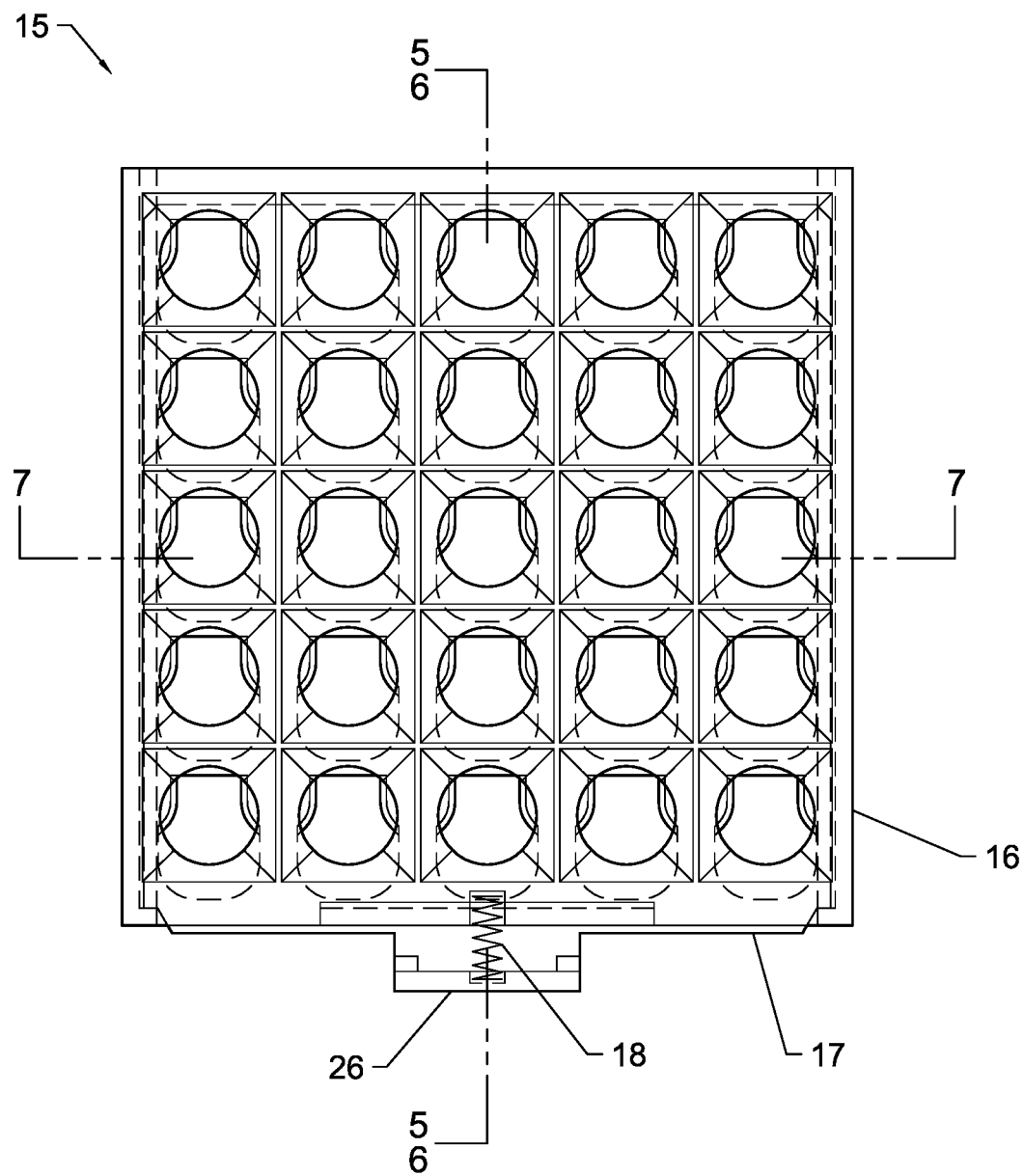
FIG. 4 is a top plan view of the module, plate, and spring combined, herein referred to as a module assembly.
Figure 7:
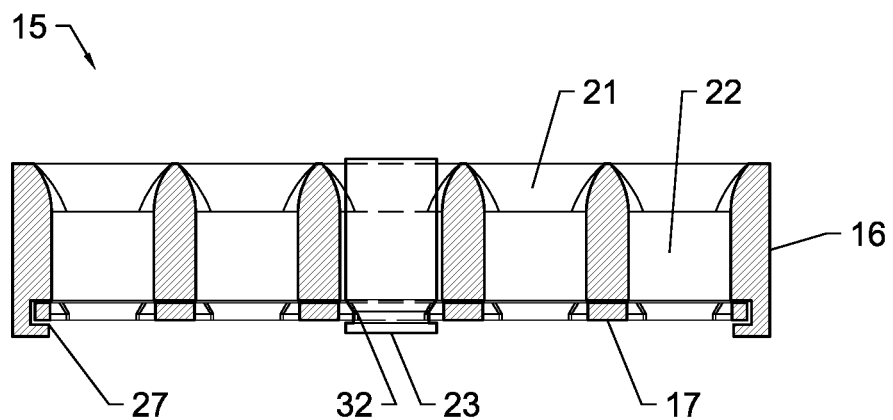
FIG. 7 is a cross-sectional view of the module assembly illustrating how the plate engages in the module slot.

Referencing FIG. 3, the plate 17 with a plurality of apertures 34 matching the number and arrangement of bores 22 in the module 16 is captured in a slot in the bottom of the module 16. Module 16, plate 17, and a spring 18 combination is referred herein as a module assembly 15. The plate 17 captured in a module slot 27 is shown in FIG. 7. Each aperture 34 is designed with beveled engaging tabs 32 which extend into the ammunition case 23 extraction groove when the plate 17 is in the capture position. The apertures 34 are large enough to allow an ammunition case 23 to fall through the aperture 34 when the plate 17 is in the release position. Alternative embodiments for engaging tab 32 design have been shown to be functional, for example, a beveled engaging tab extending across the full width of the back face of the aperture 34. It is to be understood that the plate 17 design is not limited to the precise form shown in the illustrated embodiment.

A spring 18 provides pressure to hold the plate 17 in the capture position when at rest. The spring 18 is installed between a spring pocket 31 on the inside face of the button 26 and a corresponding spring pocket 31 on the outside face of the module 16. Stops at the end of the module slots 27 prevent the plate 17 from moving beyond the capture position. When ammunition cases 23 are engaged by the plate 17, force between ammunition cases 23 and plate 17 hold the plate 17 clear of the stops. Material of the plate 17 is necessary to be somewhat flexible in the illustrated embodiment in order to install the plate 17 into the slots 27 from the opposite end of the stops, because the button 26 extends above the height of the plate 17. If it is desired to fabricate the plate 17 from rigid material, the button 26 may be attached to the plate 17 after insertion of plate 17 in slot 27.

Figure 2:
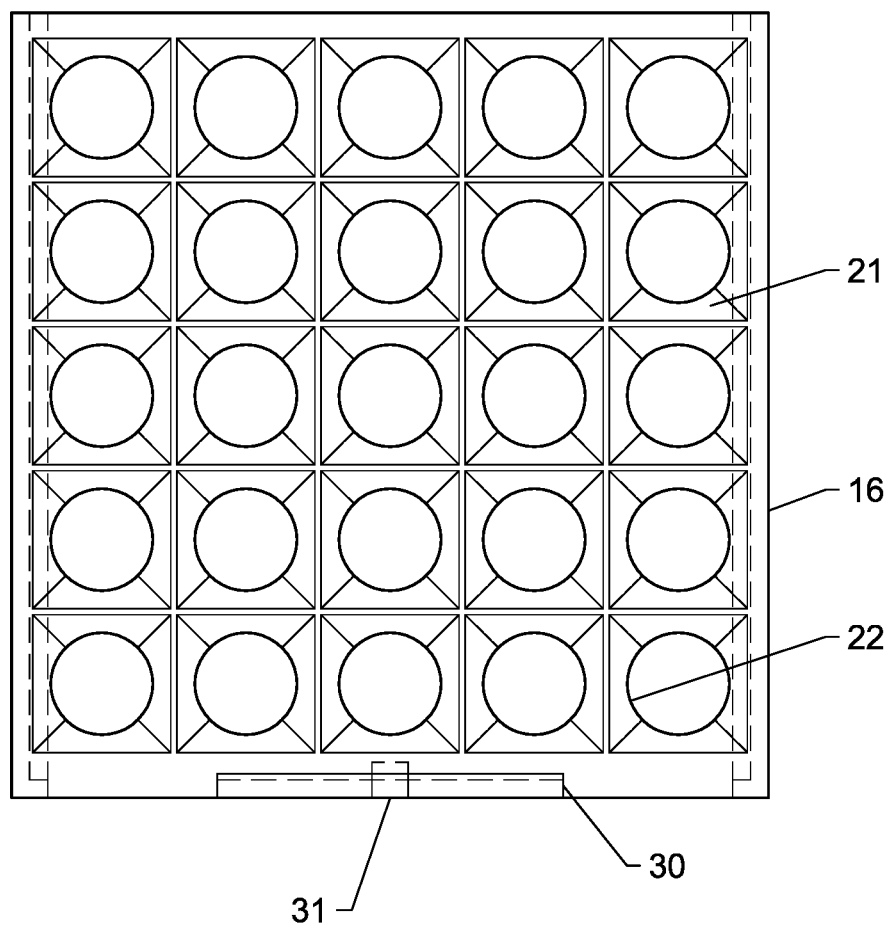
FIG. 2 is a top plan view of the module showing funnel arrangement.
Figure 5:
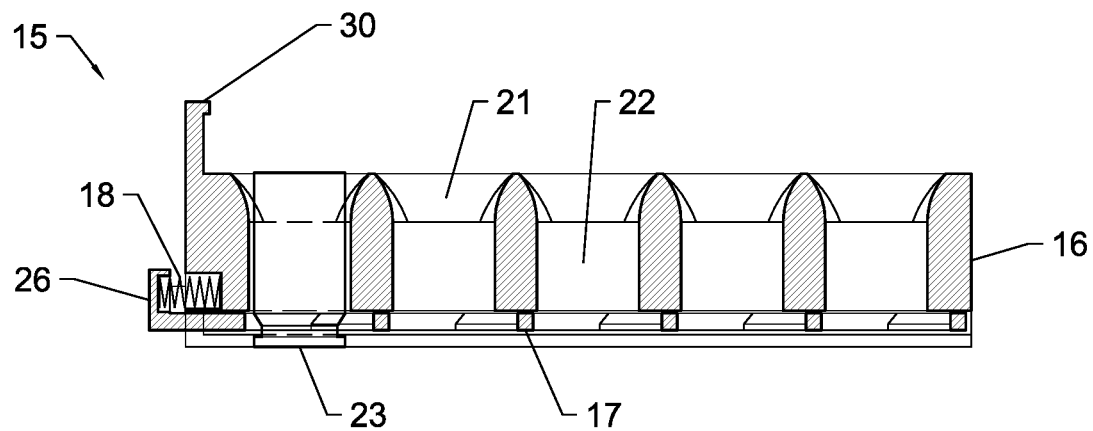
FIG. 5 is a cross-sectional view of the module assembly illustrating the sliding motion of the plate in the module slot, with an ammunition case shown in the assembly and the plate in the release position.
Figure 6:
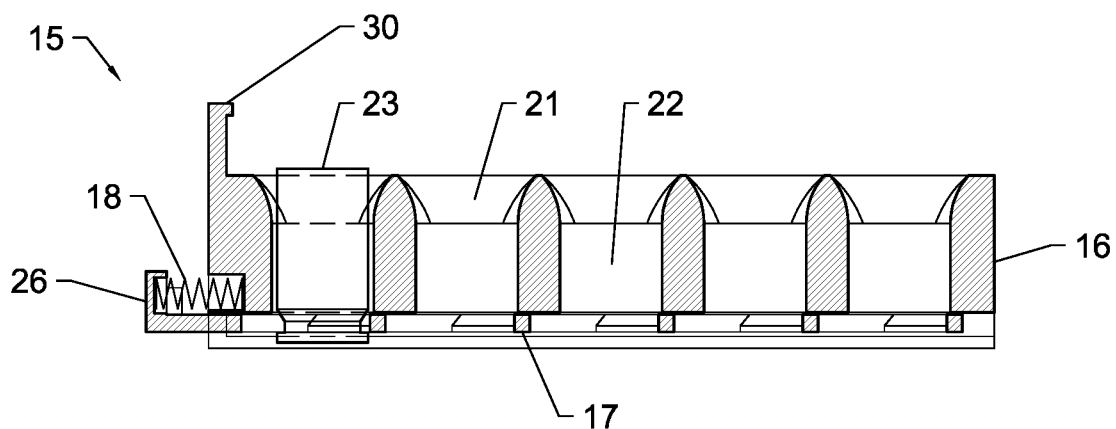
FIG. 6 is a cross-sectional view similar to FIG. 5, but with the plate in the capture position.

A grasping tab 30 is shown in FIGS. 1 and 2 and is also prominently seen in FIGS. 5 and 6. It is provided to aide in transportation of the module assembly 15, and also to provide a surface to place fingers over when operating the button 26 with the thumb.

Figure 8:
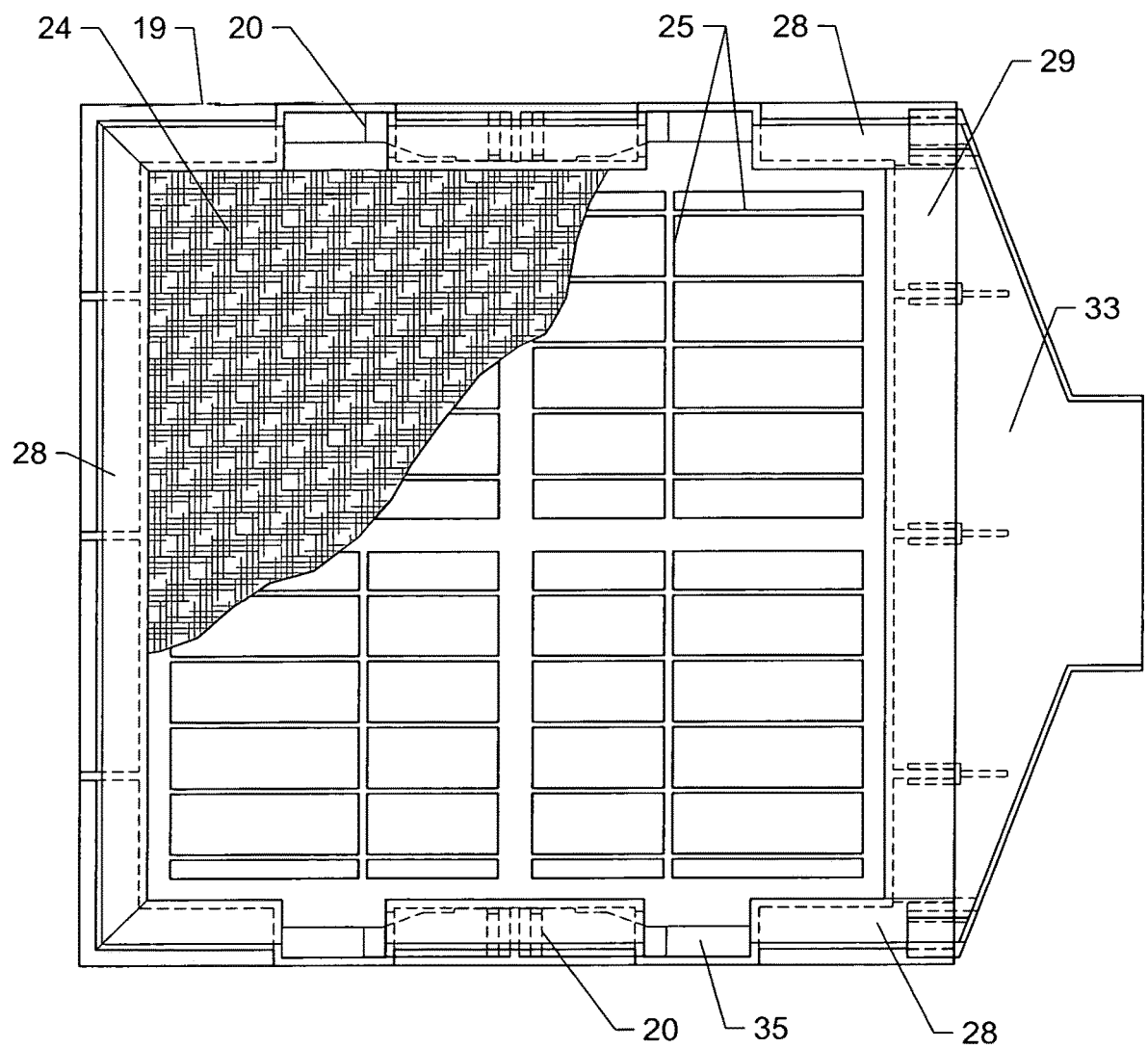
FIG. 8 is a top plan view of the tray showing the substructure, screen supported by the substructure, with overflow funnel attached.

FIG. 8 shows a tray 19 with a supporting structure 25 on the bottom of the tray 19. The tray 19 is designed to contain a plurality of module assemblies 15. A rigid screen 24 is installed over the entirety of the supporting structure 25. This horizontal screen 24 provides a platform for ammunition cases 23 on which to be supported after they have passed through the bore of the module assembly 15 and are in place and ready for module assemblies 15 to be converted to the capture position. The screen 24 also allows liquid to pass through the tray 19. The screen is selected such that openings will not allow common ammunition case 23 cleaning media such as stainless steel pins to fall through. The tray 19 has containment sides 28 on the perimeter excepting one end to contain ammunition cases 23 poured over the module assemblies 15. The containment sides 28 are positioned at a 45 degree angle in the illustrated embodiment. The sloped sides 28 extend from the elevation of the top of the module assemblies 15 upward approximately 1 inch. A vertical face extends from the elevation of the screen 24 to the elevation of the base of the containment sides 28 and forms a perimeter around the module assemblies 15. The illustrated embodiment contains four module assemblies 15, although it should be understood that the concept is not limited to a particular number of module assemblies 15 contained in an appropriately sized tray 19. One end of the tray 19 has a flat horizontal face, herein referred to as an overflow lip 29. The elevation of the overflow lip 29 is approximately the same as the top face of the module assemblies 15. The purpose of the overflow lip 29 is to allow excess ammunition cases 23 to be swept off the top of the module assemblies 15. A removable overflow funnel 33 is affixed to the overflow lip 29 end of the tray 19, acting as an extension of the overflow lip 29 directing extra cases 23 swept off the module assemblies 15 into a container as desired.

Figure 9:
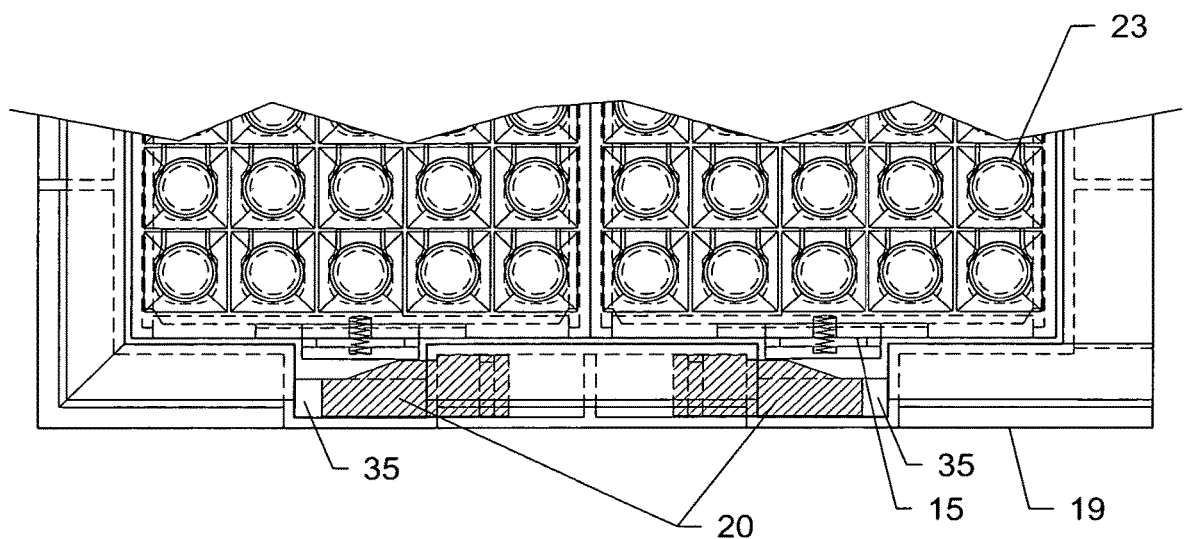
FIG. 9 and FIG. 10 are top plan views showing wedge devices within the sides of the tray designed to interface with plates in module assemblies; plates are shown in the release position in FIG. 9 and in the capture position in FIG. 10.
Figure 10:
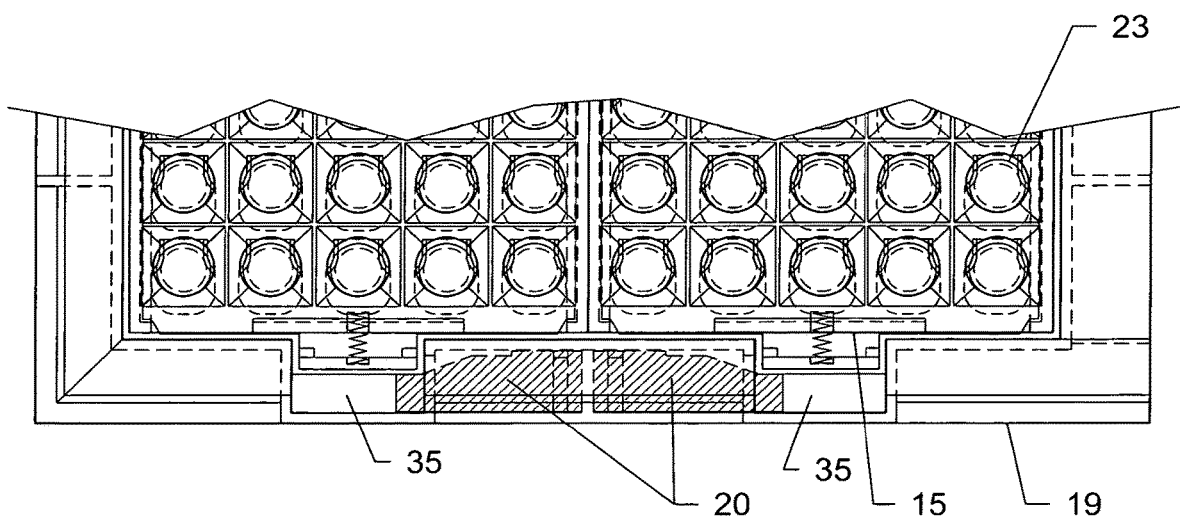

Sides of the tray 19 are fitted with wedges 20 which slide perpendicular to the direction of the plate 17 movement. The wedges 20 are located at such elevation that they may engage the button 26 on the plate 17. The wedges 20, when withdrawn, are positioned such that most of the wedge 20 is outside of the tray 19 interior perimeter. When advanced, the wedges 20 are slid into the wedge pockets 35 in the tray 19 interior so that the wedge 20 forces the button 26, and therefore the plate 17, in a perpendicular direction. FIG. 9 shows the advanced position. When the wedges 20 are withdrawn from the wedge pockets 35, the plate 17 returns. FIG. 10 shows the withdrawn position. Embodiment of the module 16, plate 17, tray 19, wedges 20, and overflow funnel 33 are preferably formed of a suitable synthetic plastics material such as ABS, PETG or polycarbonate.

Typical workflow function of the illustrated embodiment is as follows. Wedges 20 are oriented in the withdrawn position in the tray 19. Four module assemblies 15 are inserted into the tray 19, with buttons 26 oriented within the wedge pockets 35 on each side. Wedges 20 are extended into the wedge pockets 35 thereby engaging the buttons 26 and converting the module assemblies 15 to release position. A number of ammunition cases 23 are poured over the top of the module assemblies 15. The user gently shakes the tray 19 back and forth in a random pattern as necessary to induce the ammunition cases 23 to fall into the funnels 21 and thus occupy the bores 22. At this point any extra ammunition cases 23 are swept off the overflow lip 29 end, through the overflow funnel 33 if attached. If any ammunition cases 23 have not oriented correctly in the bores 22, they are picked out by hand and re-oriented. Wedges 20 are then withdrawn; this causes the module assemblies 15 to convert to capture position thus engaging the extractor groove of the ammunition cases 23 with the engaging tabs 32 in the plate 17 thereby holding the ammunition cases 23. The module assemblies 15 may now be picked up out of the tray 19 by the grasping tab 30 and moved to a horizontal surface, where the user depresses and holds button 26 thereby converting the module assembly 15 to release position, after which the module assembly 15 may be lifted off the released ammunition cases 23. The released ammunition cases 23 are now ready to be coated with spray lube, inspected, and processed in any number of ways. After the ammunition cases 23 have been released, if the user wishes to transport them again as a group, the button 26 may be depressed and held and the module assembly 15 lowered over the ammunition cases 23 whereby the button 26 is released again, capturing the ammunition cases 23 for transport.

I claim:

1. A module assembly comprising in combination:
   a module which contains an array of funnels on the upper horizontal face which direct ammunition cases to fall into bores as they are poured onto the module;
   a slot at the bottom of the module which holds a plate that is caused to move back and forth within the slot to capture or release said ammunition cases;
   an array of apertures within said plate at same pattern and spacing as said bores;
   engaging tabs within said array of apertures which engage an extractor groove in said ammunition cases;
   a spring which holds the plate in an engaged position while said module assembly is at rest to capture the cases until such time as the user intervenes;
   the same spring which also is compressed by the user to change the position of the plate to a release position thereby generally aligning the apertures in the plate with the bores and causing the ammunition cases to be released from the module assembly.

2. The module assembly according to claim 1 wherein the module assembly is shaken with a horizontal back-and-forth movement that induces ammunition cases which have been poured onto the upper horizontal face to fall, with the aid of the force of gravity, generally heavy-end down into the funnels and subsequently proceed into the bores in the same orientation.

3. The module assembly according to claim 1 where the module and plate are made of plastic or any suitable rigid or semi-rigid material.

4. A device for organizing, conveying, and placing ammunition cases comprising:
   A tray;
   a plurality of module assemblies, each of which comprises in combination:
      a module which contains an array of funnels on the upper horizontal face which direct ammunition cases to fall into bores as they are poured onto the module;
      a slot at the bottom of the module which holds a plate that is caused to move back and forth within the slot to capture or release said ammunition cases;
      an array of apertures. within said plate at same pattern and spacing as said bores;
      engaging tabs within said array of apertures which engage an extractor groove in said ammunition cases;
      a spring which holds the plate in an engaged position while said module assembly is at rest to capture the cases until such time as the user intervenes;
      the same spring which also is compressed by the user to change the position of the plate to a release position thereby generally aligning the apertures in the plate with the bores and causing the ammunition cases to be released from the module assembly;
   wherein
      said tray comprises in combination:
         a depressed area into which the plurality of module assemblies are received;
         a flat horizontal surface at the bottom of the depressed area;
         mechanisms in the sides of the tray which interface with the plates in each of the plurality of module assemblies by applying pressure to the plates to hold them in the release position or alternatively releasing pressure from the plates to leave them in the capture position, which is the at-rest position;
         sides of said tray which extend above the top surface of the plurality of module assemblies to act as a partial perimeter to contain ammunition cases as they are poured over the plurality of module assemblies;
         an overflow lip aligned with the top of the plurality of module assemblies which allows extra cases to be swept off the top surface of the plurality of module assemblies after the bores in the plurality of module assemblies have been occupied.

5. The device for organizing, conveying, and placing ammunition cases according to claim 4 wherein said mechanisms in the side of the tray are wedges which, when advanced and withdrawn, apply pressure to the plates in each of the plurality of module assemblies thereby causing them to be moved in the perpendicular direction of the wedge motion.

6. The device for organizing, conveying, and placing ammunition cases according to claim 4 wherein said horizontal surface at the bottom of the depressed area is a screen supported by an open substructure which together allows liquid to flow through the tray.

7. The device for organizing, conveying, and placing ammunition cases according to claim 4 which further comprises a funnel-shaped end piece attached to said overflow lip which serves to direct extra cases into a specific area.

* * * * *